United States Patent
Hosoi

(10) Patent No.: US 11,689,112 B2
(45) Date of Patent: Jun. 27, 2023

(54) DC-DC CONVERTER AND VEHICLE

(71) Applicant: Panasonic Intellectual Property Management Co., Ltd., Osaka (JP)

(72) Inventor: Hiroyuki Hosoi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/582,608

(22) Filed: Jan. 24, 2022

(65) Prior Publication Data

US 2022/0263418 A1   Aug. 18, 2022

(30) Foreign Application Priority Data

Feb. 16, 2021 (JP) .................................. 2021-022442

(51) Int. Cl.
*H02M 3/335* (2006.01)
*B60L 53/22* (2019.01)

(52) U.S. Cl.
CPC ......... *H02M 3/33573* (2021.05); *B60L 53/22* (2019.02); *H02M 3/33592* (2013.01); *B60L 2210/10* (2013.01)

(58) Field of Classification Search
None
See application file for complete search history.

(56) References Cited

U.S. PATENT DOCUMENTS

2010/0182814 A1*  7/2010  Tada ................. H02J 7/342
                                                363/134
2020/0287469 A1*  9/2020  Cho ................... H02M 1/08

FOREIGN PATENT DOCUMENTS

JP        2013-074763 A    4/2013

* cited by examiner

*Primary Examiner* — Jared Fureman
*Assistant Examiner* — Aqeel H Bukhari
(74) *Attorney, Agent, or Firm* — Seed IP Law Group LLP

(57) ABSTRACT

A DC-DC converter includes a DC-AC conversion circuit, a transformer, rectifier circuits, smoothing circuits, and an output circuit. The DC-AC conversion circuit converts a DC input voltage to a primary-side AC voltage. The transformer includes a primary-side coil to which the primary-side AC voltage is applied, and secondary-side coils magnetically coupled to the primary-side coil. The rectifier circuits are provided in one-to-one correspondence with the secondary-side coils. Each of the rectifier circuits outputs a rectification voltage resulting from full-wave rectification on the secondary-side AC voltage output from the corresponding secondary-side coil out of the secondary-side coils. The smoothing circuits are provided in one-to-one correspondence with the rectifier circuits. Each of the smoothing circuits smooths the rectification voltage output from the corresponding rectifier circuit out of the rectifier circuits. The output circuit is connected to respective output terminals of the smoothing circuits. The output circuit outputs a DC output voltage.

7 Claims, 4 Drawing Sheets

DC-DC CONVERTER AND VEHICLE

CROSS-REFERENCE TO RELATED APPLICATIONS

This application is based upon and claims the benefit of priority from Japanese Patent Application No. 2021-022442, filed on Feb. 16, 2021, the entire contents of which are incorporated herein by reference.

FIELD

The present disclosure relates to a DC-DC converter and a vehicle.

BACKGROUND

Insulated-type DC-DC converters using transformers have been known. Such DC-DC converters are used in, for example, onboard chargers for charging lead-acid batteries with the power of onboard lithium-ion batteries. The DC-DC converter used in an onboard charger converts, for example, a DC voltage on the order of 360 V of a lithium-ion battery into a DC voltage on the order of 14 V. As an example of the related art, Japanese Patent Publication No. 5660729 discloses a DC-DC converter using a transformer.

Incidentally, a DC-DC converter outputs a large output current when a relatively large DC voltage is stepped down to a relatively small DC voltage. Hence, in this case, in a DC-DC converter, a relatively large current flows in elements such as the secondary-side coil of the transformer and the secondary-side metal oxide semiconductor field effect transistor (MOSFET). In DC-DC converter, when a large current flows in the secondary-side elements, a large loss occurs in the elements, resulting in large heat generation and high temperature of the element. DC-DC converters used in onboard chargers are used in high temperature environments, and hence there has been a possibility that, in particular, temperature of the elements may rise.

An object of the present disclosure is to provide a DC-DC converter and a vehicle, each being capable of reducing the loss in the secondary-side elements and lowering temperature of the elements.

SUMMARY

A DC-DC converter according to the present disclosure includes a DC-AC conversion circuit, a transformer, multiple rectifier circuits, multiple smoothing circuits, and an output circuit. The DC-AC conversion circuit is configured to converts a DC input voltage to a primary-side AC voltage. The transformer includes a primary-side coil to which the primary-side AC voltage is applied, and multiple secondary-side coils magnetically coupled to the primary-side coil. The multiple rectifier circuits are provided in one-to-one correspondence with the multiple secondary-side coils. Each of the multiple rectifier circuits is configured to output a rectification voltage resulting from full-wave rectification on the secondary-side AC voltage output from the corresponding secondary-side coil out of the multiple secondary-side coils. The multiple smoothing circuits are provided in one-to-one correspondence with the multiple rectifier circuits. Each of the multiple smoothing circuits is configured to smooth the rectification voltage output from the corresponding rectifier circuit out of the multiple rectifier circuits. The output circuit is connected to respective output terminals of the multiple smoothing circuits. The output circuit is configured to output a DC output voltage.

DETAILED DESCRIPTION

An embodiment of a DC-DC converter 10 according to the present disclosure will be described with reference to the drawings.

Figure 1:
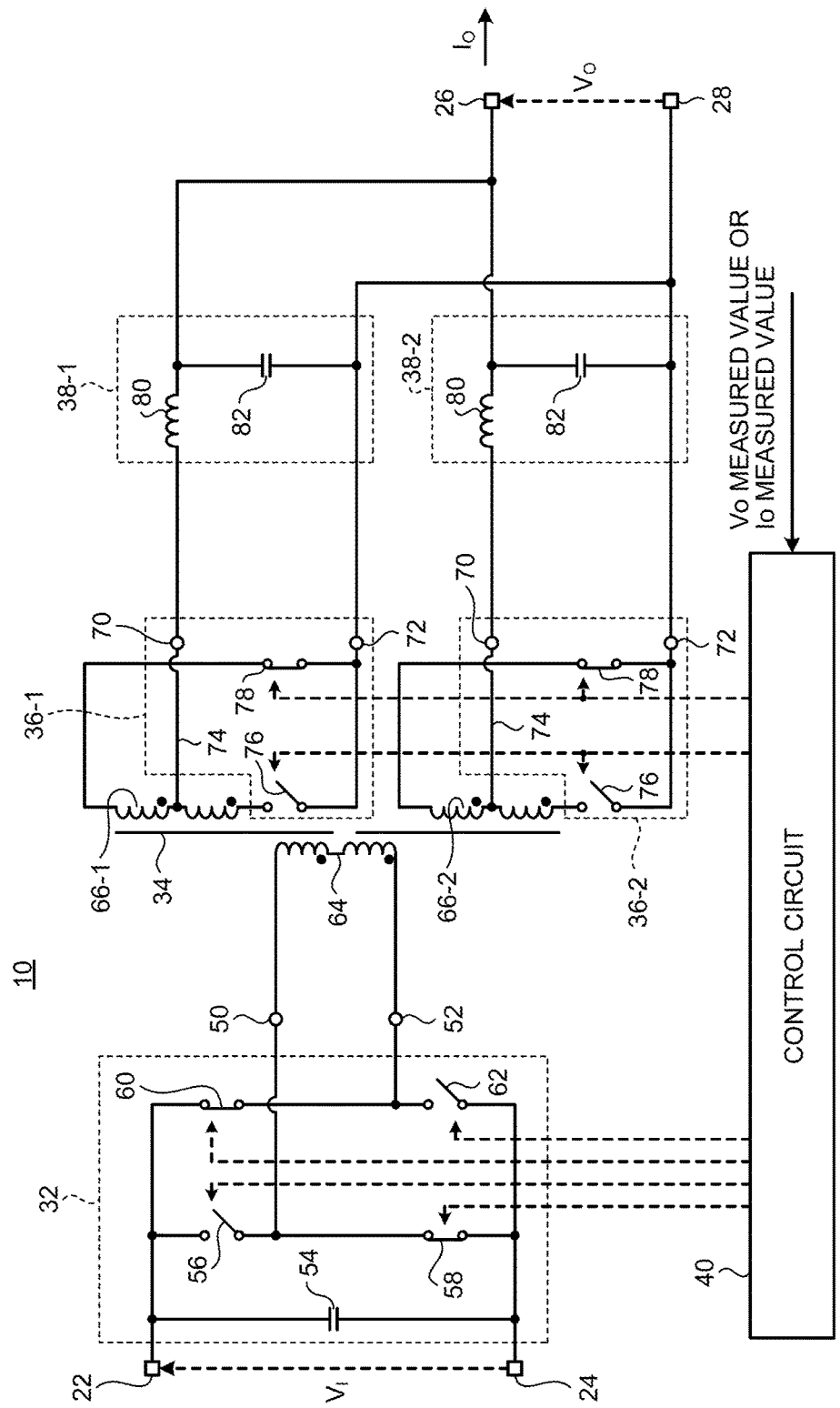
FIG. 1 is a diagram illustrating a configuration of a DC-DC converter according to a first embodiment.

FIG. 1 is a diagram illustrating the configuration of the DC-DC converter 10 according to a first embodiment. The DC-DC converter 10 is a power conversion device that receives a DC input voltage $V_1$ from a previous-stage device, performs power-converting on the received DC input voltage $V_1$ to obtain a DC output voltage $V_O$, and supplies the output voltage $V_O$ to a subsequent-stage device. According to the present embodiment, the DC-DC converter 10 outputs a DC output voltage $V_O$ resulting from stepping down the DC input voltage $V_1$. Note that the DC-DC converter 10 may output the DC output voltage $V_O$ resulting from stepping up the DC input voltage $V_1$.

The DC-DC converter 10 includes a first input terminal 22, a second input terminal 24, a first output terminal 26, a second output terminal 28, a DC-AC conversion circuit 32, a transformer 34, multiple rectifier circuits 36, multiple smoothing circuits 38, and a control circuit 40.

The DC-DC converter 10 receives, between the first input terminal 22 and the second input terminal 24, the DC input voltage $V_1$ from the previous-stage device. Electric potential at the first input terminal 22 is higher than electric potential at the second input terminal 24. Cables, wiring, or the like, which connect to the previous-stage device, may be joined to the first input terminal 22 and the second input terminal 24.

The DC-DC converter 10 outputs, to a subsequent-stage device, a DC output voltage $V_O$ between the first output terminal 26 and the second output terminal 28. Therefore, the first output terminal 26 and the second output terminal 28 function as an output circuit serves to output the DC output voltage $V_O$. Electric potential at the first output terminal 26 is higher than electric potential at the second output terminal 28. Cables, wiring, or the like, which connect to the subsequent-stage device, may be joined to the first output terminal 26 and the second output terminal 28.

The DC-AC conversion circuit 32 converts the DC input voltage $V_1$ applied between the first input terminal 22 and the second input terminal 24 into an AC voltage, which is the primary-side AC voltage. Then, the DC-AC conversion circuit 32 outputs the primary-side AC voltage between a first AC terminal 50 and a second AC terminal 52. The waveform of the primary-side AC voltage may be a pulse-like waveform.

The DC-AC conversion circuit 32 is, for example, a full bridge-type converter. In the case of a full-bridge type converter, the DC-AC conversion circuit 32 includes a conversion capacitor 54, a first conversion switch 56, a second conversion switch 58, a third conversion switch 60, and a fourth conversion switch 62. The first conversion switch 56, the second conversion switch 58, the third conversion switch 60, and the fourth conversion switch 62 are semiconductor elements such as MOSFETs that switch power lines to conduct or not conduct in accordance with control by the control circuit 40.

A conversion capacitor 54 is connected between the first input terminal 22 and the second input terminal 24. The first conversion switch 56 is connected between the first input terminal 22 and the first AC terminal 50. The second conversion switch 58 is connected between the first AC terminal 50 and the second input terminal 24. The third conversion switch 60 is connected between the first input terminal 22 and the second AC terminal 52. The fourth conversion switch 62 is connected between the second AC terminal 52 and the second input terminal 24. The first conversion switch 56, the second conversion switch 58, the third conversion switch 60, and the fourth conversion switch 62 are each controlled by the control circuit 40 such that a primary-side AC voltage is generated between the first AC terminal 50 and the second AC terminal 52. Accordingly, the DC-AC conversion circuit 32 is capable of converting the DC input voltage $V_1$ to the primary-side AC voltage.

Note that the conversion capacitor 54 may be located outside the input side of the DC-AC conversion circuit 32. Moreover, the DC-AC conversion circuit 32 may be of the half-bridge type instead of the full-bridge type.

The transformer 34 includes a primary-side coil 64 and multiple secondary-side coils 66. According to the present embodiment, the transformer 34 includes, as the multiple secondary-side coils 66, a first secondary-side coil 66-1 and a second secondary-side coil 66-2.

The primary-side coil 64 is connected between the first AC terminal 50 and the second AC terminal 52. The multiple secondary-side coils 66 (66-1 and 66-2) are each magnetically coupled to the primary-side coil 64. The multiple secondary-side coils 66 each output a secondary-side AC voltage on the basis of partial power of the primary-side AC voltage. The multiple secondary-side coils 66 output secondary-side AC voltages having mutually same power and polarity. Thus, the transformer 34 generates a secondary-side AC voltage in the multiple secondary-side coils 66 by applying a primary-side AC voltage to the primary-side coil 64.

The multiple rectifier circuits 36 are provided in one-to-one correspondence with the multiple secondary-side coils 66. The multiple rectifier circuits 36 each perform full-wave rectification on the secondary-side AC voltage output from the corresponding secondary-side coil 66 out of the multiple secondary-side coils 66. Each of the rectifier circuits 36 then outputs a rectified voltage resulting from the full-wave rectification. According to the present embodiment, the DC-DC converter 10 includes a first rectifier circuit 36-1 corresponding to the first secondary-side coil 66-1, and a second rectifier circuit 36-2 corresponding to the second secondary-side coil 66-2.

The multiple rectifier circuits 36 each perform, for example, a center-tapped type of synchronous full-wave rectification. In this case, the rectifier circuits 36 each include a first intermediate terminal 70, a second intermediate terminal 72, wiring 74, a first rectification switch 76, and a second rectification switch 78.

The wiring 74 connects the center tap of the corresponding secondary-side coil 66 to the first intermediate terminal 70. The first rectification switch 76 and the second rectification switch 78 are semiconductor elements such as MOSFETs that perform switching of power lines to conduct or not conduct in accordance with control by the control circuit 40. The first rectification switch 76 is connected between the first terminal, which is one end of the corresponding secondary-side coil 66, and the second intermediate terminal 72. The second rectification switch 78 is connected between a second terminal, which is another end of the corresponding secondary-side coil 66 to which the first rectification switch 76 is not connected, and the second intermediate terminal 72.

The first rectification switch 76 is controlled by the control circuit 40 to turn on in a period during which voltage is output, which is generated by that the potential of the first terminal is lower than the potential of the second terminal, and to turn off in a period during which voltage is output, which is generated by that the potential of the first terminal is higher than the potential of the second terminal. The second rectification switch 78 is controlled by the control circuit 40 to turn on in a period during which voltage is output, which is generated by that the potential of the second terminal is lower than the potential of the first terminal, and to turn off in a period during which voltage is output, which is generated by that the potential of the second terminal is higher than the potential of the first terminal. Accordingly, the multiple rectifier circuits 36 are each capable of outputting a full-wave rectification voltage between the first intermediate terminal 70 and the second intermediate terminal 72.

Note that the multiple rectifier circuits 36 are each not limited to the center-tapped type of synchronous full-wave rectification described above, and may perform another type of full-wave rectification. For example, the multiple rectifier circuits 36 may each perform a full bridge-type of synchronous full-wave rectification, or may perform diode rectification.

The multiple smoothing circuits 38 are provided in one-to-one correspondence with the multiple rectifier circuits 36. The multiple smoothing circuits 38 each smooth the rectification voltage output from the corresponding rectifier circuit 36 out of the multiple rectifier circuits 36. According to the present embodiment, the DC-DC converter 10 includes a first smoothing circuit 38-1 corresponding to the first rectifier circuit 36-1, and a second smoothing circuit 38-2 corresponding to the second rectifier circuit 36-2.

The multiple smoothing circuits 38 may each be, for example, an LC-type low-pass filter that includes a smoothing inductor 80 and a smoothing capacitor 82. In this case, the smoothing inductor 80 and the smoothing capacitor 82 are connected in series between the corresponding first intermediate terminal 70 and the corresponding second intermediate terminal 72. Additionally, in this case, the multiple smoothing circuits 38 each output the voltage between both ends of the smoothing capacitor 82, as the voltage resulting from smoothing the rectification voltage.

Note that, according to the present embodiment, the multiple smoothing circuits 38 need not be the LC-type low-pass filters described above. For example, the multiple smoothing circuits 38 may each be a circuit that includes a smoothing capacitor 82 connected between the corresponding first intermediate terminal 70 and the corresponding second intermediate terminal 72, but does not include an inductor.

The first output terminal 26 and the second output terminal 28 are connected to all output terminals of the multiple smoothing circuits 38. More precisely, the first output terminal 26 is connected to all the output terminals with positive-potential of the multiple smoothing circuits 38. The second output terminal 28 is connected to all the output terminals with negative-potential of the multiple smoothing circuits 38. The first output terminal 26 is connected to a terminal of the smoothing capacitor 82 in each of the multiple smoothing circuits 38, wherein the terminal is connected to the smoothing inductor 80. The second output terminal 28 is connected to a terminal of the smoothing capacitor 82 in each of the multiple smoothing circuits 38, wherein the terminal is not connected to the smoothing inductor 80.

The first output terminal 26 and the second output terminal 28 output a DC output voltage $V_O$ to a subsequent-stage device. In other words, the first output terminal 26 and the second output terminal 28 serve as an output circuit that outputs, to a subsequent-stage device, power resulting from synthesizing power output from the multiple smoothing circuits 38.

The control circuit 40 acquires a measured value of the output voltage $V_O$ output between the first output terminal 26 and the second output terminal 28, or a measured value of the output current $I_O$ supplied to the load to which the output voltage $V_O$ is applied. The control circuit 40 calculates the deviation between the measured value of the output voltage $V_O$ and a target voltage, or the deviation between the measured value of the output current $I_O$ and a target current. The control circuit 40 then controls the amount of power for conversion of the input voltage $V_1$ to the output voltage $V_O$ so as to reduce the calculated deviation.

The control circuit 40 controls the switching of the DC-AC conversion circuit 32 to change, on the basis of the calculated deviation, the amount of power to be supplied from the DC-AC conversion circuit 32 to the transformer 34. For example, the control circuit 40 controls the ratio of the ON period to the OFF period in the first conversion switch 56, the second conversion switch 58, the third conversion switch 60, and the fourth conversion switch 62, on the basis of the deviation between the measured value of the output voltage $V_O$ and the target voltage, or the deviation between the measured value of the output current $I_O$ and the target current. Specifically, for example, the control circuit 40 causes the ON period to be longer when the deviation is negative, and causes the ON period to be shorter when the deviation is positive. Thus, the control circuit 40 is able to use the output voltage $V_O$ or the output current $I_O$ as the target value. Note that the DC-DC converter 10 may be a phase shift converter. In this case, the control circuit 40 controls the phase difference between the switching timings on the basis of the deviation while keeping constant the ratio of the ON period to the OFF period in the first conversion switch 56, the second conversion switch 58, the third conversion switch 60, and the fourth conversion switch 62. Even with this configuration, the control circuit 40 is able to use the output voltage $V_O$ or the output current $I_O$ as the target value.

The control circuit 40 includes, for example, a central processing unit (CPU), a read-only memory (ROM), and a random-access memory (RAM). The control circuit 40 executes processing on the basis of a computer program which is installed in advance. For example, the control circuit 40 generates a control signal in co-operation with a processor, such as a CPU, and a program (software) stored in the ROM or the like. Note that the function of the control circuit 40 is not limited to being implemented by using software, and may also be implemented by using a hardware configuration such as a dedicated circuit.

In the DC-DC converter 10 according to the first embodiment with the foregoing configuration, the secondary side of the transformer 34 has a parallel configuration of multiple circuits. More specifically, the DC-DC converter 10 includes the multiple secondary-side coils 66 (66-1 and 66-2), the multiple rectifier circuits 36 (36-1 and 36-2), and the multiple smoothing circuits 38 (38-1 and 38-2), each being configured in parallel. Therefore, the DC-DC converter 10 according to the first embodiment is capable of reducing the current flowing in each of the elements provided in the secondary side of the transformer 34. As a result, the DC-DC converter 10 according to the first embodiment is capable of suppressing loss in each of the secondary-side elements, and capable of lowering the heat due to the loss.

Moreover, in the DC-DC converter 10 according to the first embodiment, the DC-AC conversion circuit 32 and the primary-side coil 64 are each provided as a single configuration. Therefore, the DC-DC converter 10 according to the first embodiment has a simple primary-side circuit configuration, and is able to reduce the costs. Thus, the DC-DC converter 10 is capable of suppressing heat generation by reducing loss in secondary-side elements while simplifying the configuration of primary-side elements to reduce costs.

Figure 2:
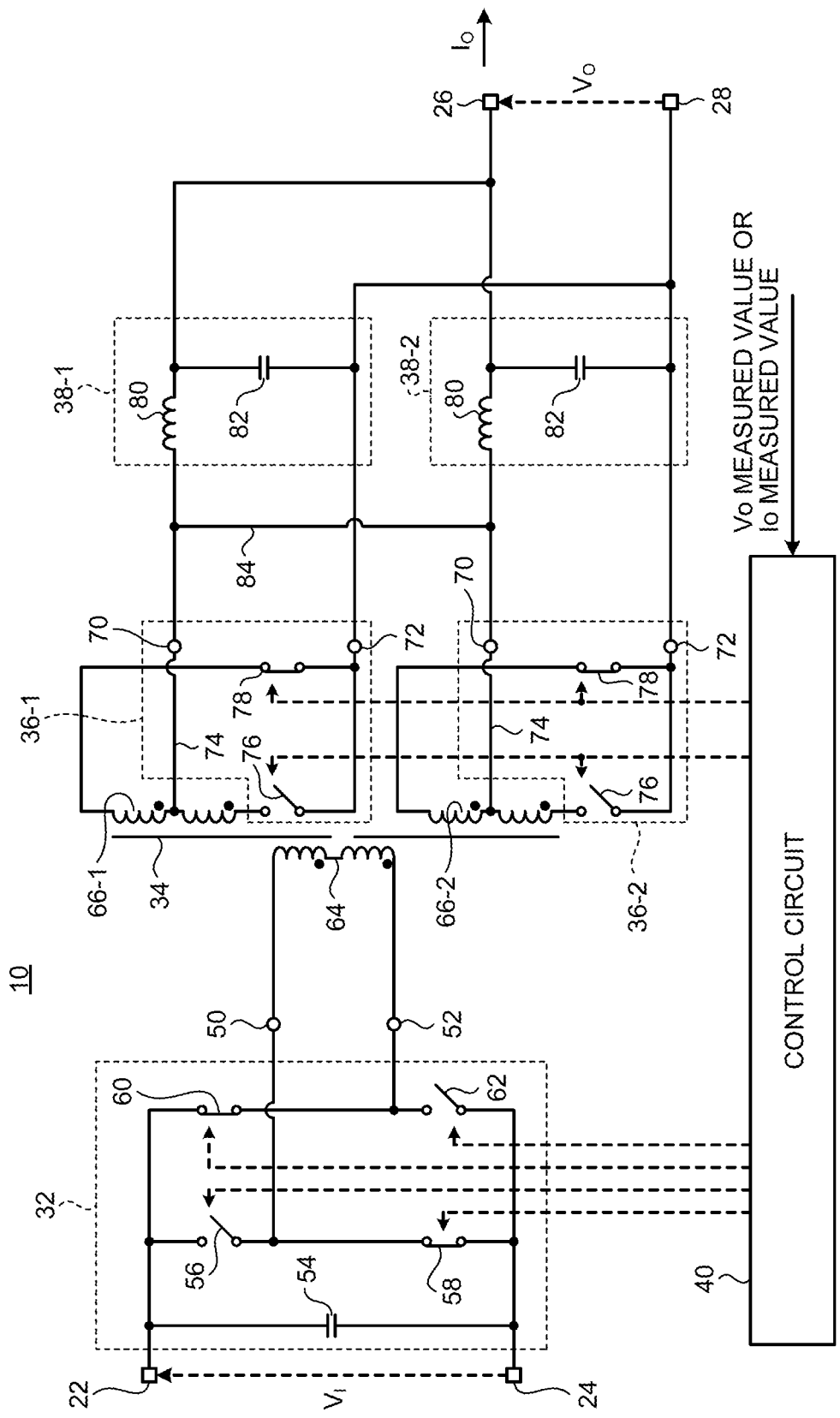
FIG. 2 is a diagram illustrating a configuration of a DC-DC converter according to a second embodiment.

FIG. 2 is a diagram illustrating the configuration of the DC-DC converter 10 according to a second embodiment. The DC-DC converter 10 according to the second embodiment partly has the same functions and configuration as those of the first embodiment. In the description of the second embodiment, circuits with the same functions and configuration as those of the first embodiment are given the same reference signs, and details are omitted except for differences.

The DC-DC converter 10 according to the second embodiment further includes short-circuiting wiring 84. The short-circuiting wiring 84 connects the output terminals of the multiple rectifier circuits 36 to one another. More specifically, the short-circuiting wiring 84 connects the respective first intermediate terminals 70 of the multiple rectifier circuits 36 to one another. In the present embodiment, the short-circuiting wiring 84 connects the first intermediate terminal 70 of the first rectifier circuit 36-1 to the first intermediate terminal 70 of the second rectifier circuit 36-2.

Accordingly, the DC-DC converter 10 according to the second embodiment synthesizes power output from the multiple rectifier circuits 36, and then distributes the synthesized power to the multiple smoothing circuits 38. When assuming that, for example, the output terminals of the multiple rectifier circuits 36 are not connected by the short-circuiting wiring 84 and there is a large difference in the inductance, the multiple secondary-side coils 66 are not able to output mutually identical secondary-side AC voltages. In this case, outputs of the multiple rectifier circuits 36 will be likely to become unsuitable. When the outputs become unstable, the multiple rectifier circuits 36 will be likely to generate a higher internal voltage than the voltage generated in a stable state. Hence, when the output terminals are not connected by the short-circuiting wiring 84, the multiple rectifier circuits 36 are each preferably configured by using elements with high voltage-resistance.

In contrast, in the DC-DC converter 10 according to the second embodiment, the output terminals of the multiple rectifier circuits 36 are connected by the short-circuiting wiring 84. Therefore, the multiple rectifier circuits 36 are each capable of outputting a stabilized rectification voltage even when the difference in the inductance of the multiple secondary-side coils 66 is large. Accordingly, the DC-DC converter 10 according to the second embodiment is capable of outputting an output voltage $V_O$ which is stable with little variation. In addition, the DC-DC converter 10 according to the second embodiment does not need to include a rectifier circuit (36) formed by using elements with high voltage-resistance, enabling costs to be reduced. Moreover, the lower the voltage-resistance of the elements is, the smaller the ON-resistance becomes, and hence the DC-DC converter 10 according to the second embodiment further suppresses loss and enables reduced heat generation.

Figure 3:
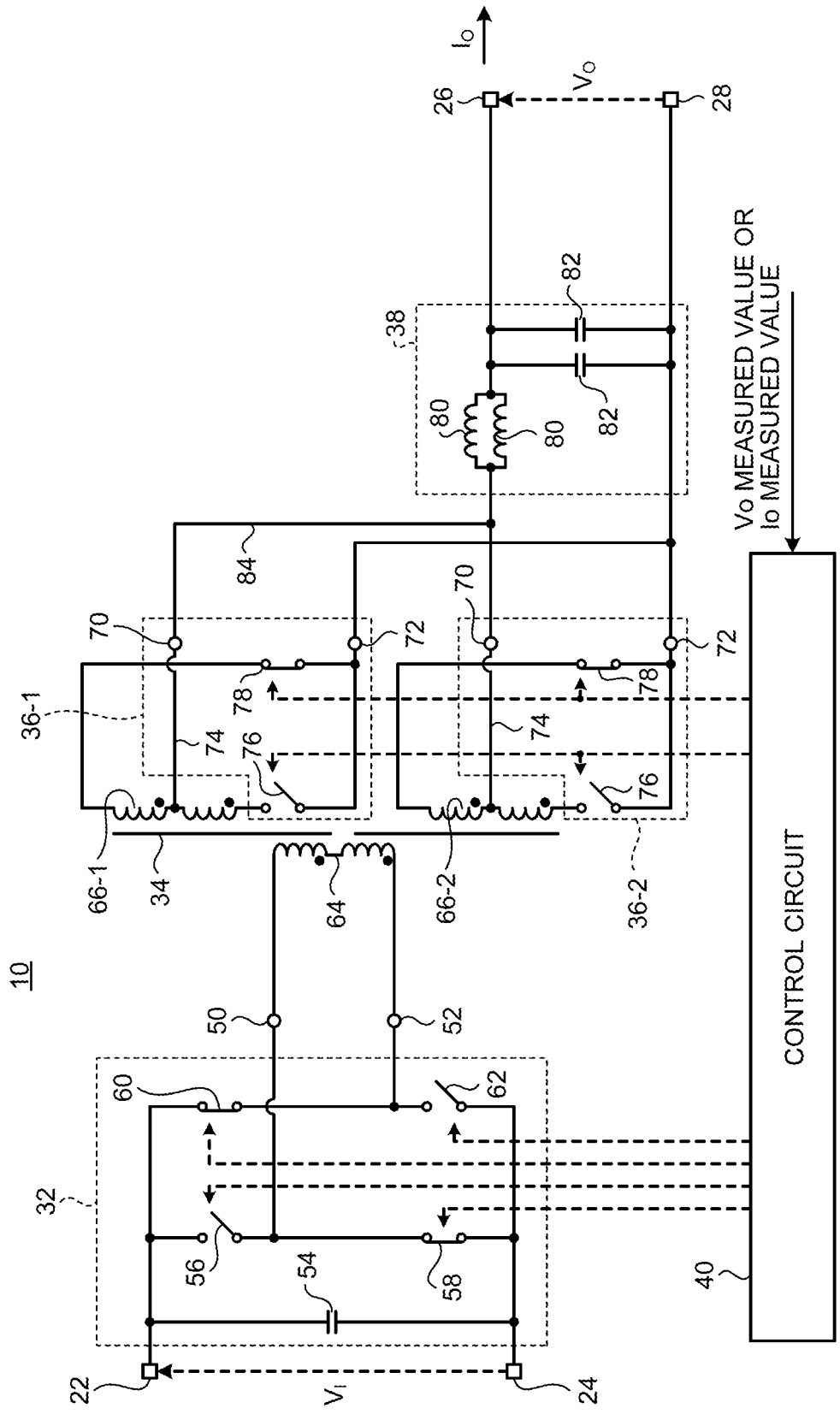
FIG. 3 is a diagram illustrating a configuration of a DC-DC converter according to a third embodiment.

FIG. 3 is a diagram illustrating the configuration of the DC-DC converter 10 according to a third embodiment. The DC-DC converter 10 according to the third embodiment partly has the same functions and configuration as those of the second embodiment. In the description of the third embodiment, circuits with the same functions and configuration as those of the second embodiment are given the same reference signs, and details are omitted except for differences.

In comparison with the second embodiment, the DC-DC converter 10 according to the third embodiment includes a single smoothing circuit 38 instead of the multiple smoothing circuits 38. According to the third embodiment, the smoothing circuit 38 synthesizes rectification voltages output from the multiple rectifier circuits 36, and receives a synthesized rectification voltage. Then, the smoothing circuit 38 outputs the DC output voltage $V_O$ which results from smoothing the synthesized rectification voltage. The DC-DC converter 10 according to the third embodiment with this configuration can bring the same advantageous effects as those of the second embodiment. In addition, the DC-DC converter 10 according to the third embodiment may include the single smoothing circuit 38, so that the configuration can be simplified.

Note that, in FIG. 3, the smoothing circuit 38 has a configuration that includes the two smoothing inductors 80 connected in parallel, and the two smoothing capacitors 82 connected in parallel. However, the smoothing circuit 38 may have another configuration that includes, for example, a single smoothing inductor 80 and a single smoothing capacitor 82.

Figure 4:
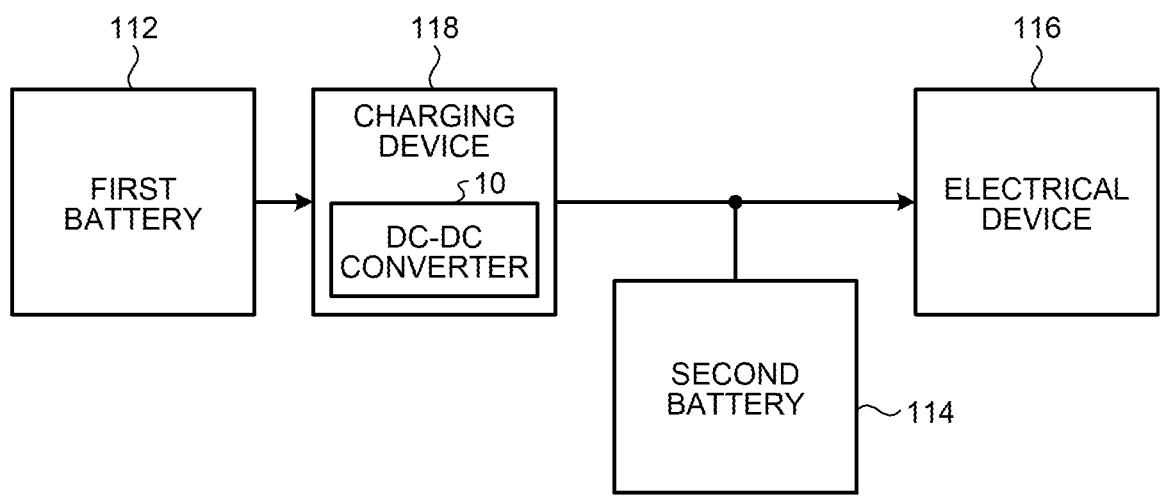
FIG. 4 is a diagram illustrating a configuration of a vehicle according to a fourth embodiment.

FIG. 4 is a diagram illustrating the configuration of a vehicle 100 according to a fourth embodiment. The vehicle 100 includes a first battery 112, a second battery 114, an electrical device 116, and a charging device 118.

The first battery 112 is, for example, a lithium-ion battery, and is supplied with power from a charging station for electric vehicles or the like. The first battery 112 generates a DC voltage on the order of 360 V, for example.

The second battery 114 is, for example, a lead-acid battery to which the power of the first battery 112 is transferred and charged. The second battery 114 generates a DC voltage on the order of 12 V, for example.

The electrical device 116 is a device installed in the vehicle 100. The electrical device 116 is operated by the power output from the charging device 118 or the power charged in the second battery 114. The electrical device 116 is, for example, an onboard computer, power steering, headlights, and an air conditioner.

The charging device 118 includes the DC-DC converter 10 according to either the first or the second embodiment. The charging device 118 takes the power from the first battery 112 and charges the second battery 114. The DC-DC converter 10 included in the charging device 118 steps down the DC voltage generated by the first battery 112 and converts it into a DC voltage for charging the second battery 114.

The vehicle 100 is able to travel by driving the motor with the power of the first battery 112. In addition, the vehicle 100 is able to drive the electrical device 116 with the power of the second battery 114 to perform various control and auxiliary operations of the vehicle 100.

The vehicle 100 is then capable of efficiently suppressing the internally generated surge voltage in the DC-DC converter 10 in the charging device 118. The vehicle 100 is thus capable of efficiently charging the second battery 114 with the power of the first battery 112.

All the embodiments described above are merely concrete examples when carrying out the present disclosure, and should not be construed as limiting the technical scope of the present disclosure. In other words, the present disclosure can be implemented in various forms without deviating from the spirit or the main characteristics thereof.

The DC-DC converter and the vehicle according to the present disclosure are capable of reducing the loss in the elements and suppressing the heat generation of the elements.

What is claimed:

1. A DC-DC converter comprising:
    a DC-AC conversion circuit configured to convert a DC input voltage to a primary-side AC voltage;
    a transformer including:
        a single primary-side coil to which the primary-side AC voltage is applied, and
        multiple secondary-side coils connected in parallel and magnetically coupled to the primary-side coil;
    multiple rectifier circuits connected in parallel and provided in one-to-one correspondence with the multiple secondary-side coils, output terminals of the multiple rectifier circuits connected in parallel being connected to each other, each of the multiple rectifier circuits being configured to output a rectification voltage resulting from full-wave rectification on a secondary-side AC voltage output from the corresponding secondary-side coil out of the multiple secondary-side coils;
    multiple smoothing circuits provided in one-to-one correspondence with the multiple rectifier circuits, each of the multiple smoothing circuits being configured to smooth the rectification voltage output from the corresponding rectifier circuit out of the multiple rectifier circuits; and
    an output circuit connected to respective output terminals of the multiple smoothing circuits, the output circuit being configured to output a DC output voltage.

2. The DC-DC converter according to claim 1, wherein each of the smoothing circuits is an LC-type low-pass filter.

3. The DC-DC converter according to claim 1, further comprising a control circuit configured to control an amount of power for conversion of the DC input voltage to the DC output voltage on the basis of a measured value of the output voltage or a measured value of an output current supplied to a load.

4. A vehicle comprising the DC-DC converter according to claim 1.

5. A DC-DC converter comprising:
    a DC-AC conversion circuit configured to convert a DC input voltage to a primary-side AC voltage;
    a transformer including:
        a single primary-side coil to which the primary-side AC voltage is applied, and
        multiple secondary-side coils connected in parallel and magnetically coupled to the primary-side coil;
    multiple rectifier circuits connected in parallel and provided in one-to-one correspondence with the multiple secondary-side coils, output terminals of the multiple rectifier circuits connected in parallel being connected to each other, each of the multiple rectifier circuits being configured to output a rectification voltage resulting from full-wave rectification on the secondary-side AC voltage output from the corresponding secondary-side coil out of the multiple secondary-side coils; and a smoothing circuit configured to:
synthesize rectification voltages output from the multiple rectifier circuits and receive a synthesized rectification voltage, and
output a DC output voltage resulting from smoothing the synthesized rectification voltage.

6. The DC-DC converter according to claim 5, wherein the smoothing circuit is an LC-type low-pass filter.

7. The DC-DC converter according to claim 5, further comprising a control circuit configured to control an amount of power for conversion of the DC input voltage to the DC output voltage on the basis of a measured value of the output voltage or a measured value of an output current supplied to a load.

* * * * *